United States Patent [19]

Anderson

[11] 4,456,332

[45] Jun. 26, 1984

[54] METHOD OF FORMING STRUCTURAL HELIOSTAT

[75] Inventor: Alfred J. Anderson, Littleton, Colo.

[73] Assignee: Atlantic Richfield Company, Los Angeles, Calif.

[21] Appl. No.: 266,991

[22] Filed: May 26, 1981

Related U.S. Application Data

[63] Continuation-in-part of Ser. No. 138,207, Apr. 7, 1980, Pat. No. 4,373,783.

[51] Int. Cl.³ .................................................. G02B 5/08
[52] U.S. Cl. ..................................... 350/320; 350/310
[58] Field of Search ................. 350/292, 299, 310, 320

[56] References Cited

U.S. PATENT DOCUMENTS

| | | | |
|---|---|---|---|
| 3,600,257 | 8/1971 | Reinhardt | 350/310 X |
| 3,906,927 | 9/1975 | Caplan | 350/310 X |
| 4,245,895 | 1/1981 | Wildenrotter | 350/310 |

FOREIGN PATENT DOCUMENTS

| | | | |
|---|---|---|---|
| 2738665 | 3/1979 | Fed. Rep. of Germany | 350/310 |
| 52-29748 | 3/1977 | Japan | 350/310 |
| 675015 | 7/1979 | U.S.S.R. | 350/310 |

*Primary Examiner*—F. L. Evans
*Attorney, Agent, or Firm*—Wofford, Fails & Zobal

[57] ABSTRACT

In forming a heliostat having a main support structure and pivoting and tilting motors and gears and a mirror module for reflecting solar energy onto a collector, the improvement characterized by a method of forming the mirror module in which the mirror is laid upon a solid rigid supporting bed in one or more sections, with or without focusing; a mirror backing sheet is applied by first applying respective thin layers of silicone grease and, thereafter, progressively rolling application to eliminate air bubbles; followed by affixing of a substrate assembly to the mirror backing sheet to form a mirror module that does not curve because of thermally induced stresses and differential thermal expansion or contraction effects. The silicone grease also serves to dampen fluttering of the mirror and protect the mirror backside against adverse effects of the weather. Also disclosed are specific details of preferred embodiments.

10 Claims, 13 Drawing Figures

METHOD OF FORMING STRUCTURAL HELIOSTAT

The government has rights of this invention pursuant to contract number MDH 83-2729E awarded by the U.S. Department of Energy.

This invention is a continuation-in-part application of application Ser. No. 138,207; same inventor; filed Apr. 7, 1980 and entitled "Thermally Stabilized Heliostat", now U.S. Pat. No. 4,373,783.

FIELD OF THE INVENTION

This invention relates to heliostats. More particularly, it relates to a method of forming a thermally stabilized heliostat for reflecting solar euergy onto a remote collector, or target; the heliostat mirror module resisting curvature induced by temperature change.

DESCRIPTION OF THE PRIOR ART

With the increased cost and scarcity of fossil fuels and other energy sources, much work is being done to try to use solar energy. In employing solar energy, a plurality of heliostats reflect the solar energy onto a remote collector.

Typical of such systems are those described in U.S. Patents. For example, U.S. Pat. No. 3,905,352 lists some fourteen earlier patents ranging from U.S. Pat. No. 260,657 through U.S. Pat. No. 3,469,837 and, itself, describes a system for collecting and transferring useable solar heat by reflecting the sun from heliostats on an elevated platform into a central receiving station.

U.S. Pat. No. 3,892,433, inventor Floyd A. Blake, describes a direct solar hydroelectric integrated system and concentrating heliostats for this system. U.S. Pat. No. 3,924,604 describes a solar energy conversion system in which pivotally mounted pads reflected energy onto an elevated tower collector.

Initially the heliostats were large structural elements with high costs per unit area. As larger total area of reflecting surface became needed, much research was put into trying to reduce the cost per unit area. This resulted in using materials such as plastic foam adhered onto a steel backing and mirror front. While this did reduce costs significantly, it introduced a thermal error in which differential expansion of the materials as the temperature changed caused a bowing of the mirror module. This made difficult keeping the mirror module focused onto the collector so as to most efficiently use the sun's energy by the collector.

In all of the prior art attempts to solve this problem have resulted in intolerably increasing the cost of the mirror modules above about $2.40 per square foot.

Thus it can be seen that the prior art has not been successful in solving the problem of thermally induced curvature, yet maintaining economical mirror modules. More particularly, it can be seen that the prior art has not provided a method that can produce economically mirror modules that resist curvature due to the extreme temperature differentials frequently encounted in arid locales where heliostats and collectors are practical.

SUMMARY OF THE INVENTION

Accordingly, it is an object of this invention to provide a method of forming economical mirror modules for use in heliostats; simultaneously solving the problem of thermally induced curvature yet having economical mirror modules.

It is a specific object of this invention to provide an improvement in a heliostat for reflecting solar energy onto a collector, the improvement being characterized by method forming mirror modules that are economical and yet do not suffer the defect of having curvature introduced by temperature changes.

These and other objects will become apparent from the descriptive matter hereinafter, particularly when taken in conjunction with the appended drawings.

In accordance with this invention there is provided an improvement in a method of forming a heliostat for reflecting solar energy onto a collector and including a main support structure; a means for pivoting and tilting the heliostat so as to keep the solar energy focused on the collector; a plurality of mirror modules for reflecting solar energy onto the collector; the improvement comprising the steps of:

a. forming a solid, rigid bed of predetermined configuration and dimensions and having at least one planar section adapted to receive a mirror facet;

b. emplacing at least one mirror facet on the bedface downward to expose its backside surface;

c. applying to the backside surface a thin layer of a silicone grease, the layer having a thickness in the range of 0.001–0.005 inch;

d. forming a mirror backing sheet of desired dimensions to cover the backside surface of the at least one mirror facet and support the mirror;

e. applying to a front side of the mirror backing sheet a thin layer of the silicone grease, the layer having a thickness in the range of 0.001–0.005 inch;

f. applying the greased front surface of the mirror backing sheet to the greased backside surface of the mirror by flexing the backing sheet and progressively and simultaneously applying and rolling from one end edge to substantially eliminate air bubbles until the entire backing sheet is firmly applied to the at least one mirror facet;

g. forming a substrate assembly by affixing a back sheet to respective internal support structure; the internal support structure having sufficient rigidity to support the mirror cantilevered from the main support structure of the heliostat and to withstand predetermined loads; the back sheet having the same coefficient of themal expansion and contraction as the mirror backing sheet such that no curvature is induced by temperature changes; the back sheet having adequate structural strength in combination with the mirror backing sheet to stabilize the internal support structure;

h. adhesively bonding the substrate assembly to the mirror backing sheet whereby there is formed a mirror module that prevents fluttering of the mirror with respect to the mirror backing sheet and protects the mirror backside against the adverse effects of the weather.

In other embodiments, the bed has a plurality of planar sections with a plurality of mirror facets emplaced thereon during the construction of the mirror module such that the respective sections of the mirror focus onto a target collector at a predetermined distance from the heliostat. Moreover, in additional specific embodiments, edge and juncture trim is emplaced to hold the mirror and prevent adverse effects of rain, weather and the like between the backside of the mirror and the backing sheet.

DESCRIPTION OF THE PREFERRED EMBODIMENTS

Figure 2:
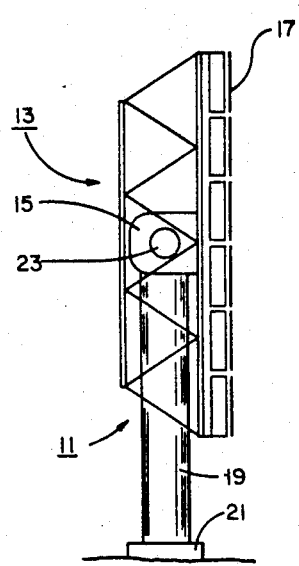
FIG. 2 is a side elevational view of the heliostat of FIG. 1.
Figure 1:
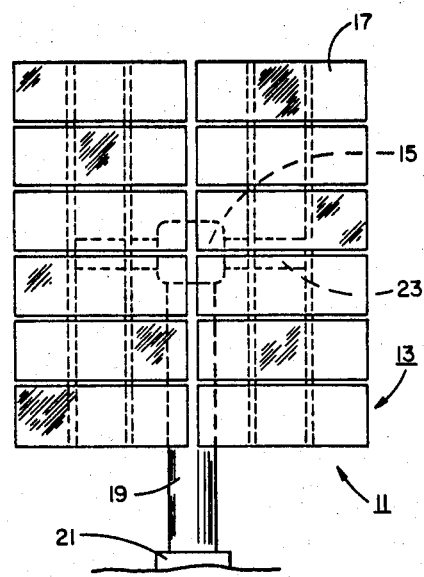
FIG. 1 is a front plan view of a heliostat in accordance with an embodiment of this invention.
Figure 5:
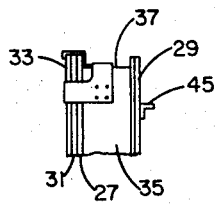
FIGS. 5 and 6 are respective partial side and top views showing corner details when employing C-beams.

As indicated hereinbefore, the usual solar system includes a collector for receiving and using the radiant energy from the sun. The solar system also includes a plurality of reflectors, or heliostats, for reflecting the sun's radiant energy onto the collector. Ordinarily, in the prior art, the collector was supported on a tower to facilitate receiving the radiant energy from a plurality of reflector means spaced about the collector. For example, where a plurality of three or more rows of the respective reflectors, or heliostats, were employed, the tower was at least 100 feet high, or higher. Usually it was about 200 feet high.

In the prior art, the collector was a steam generator for heating water to produce steam or photovoltaic cells to produce electricity directly. Other type collectors can be employed and it is immaterial to this invention as to the nature of the collector. For example, where water was converted to steam, the steam was passed through turbines rotating generators generating electricity. If desired, the collector may absorb the radiant energy to convert it to heat for heating oil or other high boiling liquid that will be passed in heat exchange relationship with water or the like.

The nature of the towers is immaterial to this invention.

Ordinarily, respective sensors are disclosed between the heliostats and the target collector to detect and control alignment of the reflected beams and insure that all of the sunlight is reflected onto the collector by the heliostat, and the most efficient use is made of the sunlight available. These type of sensors are well known in the art and need not be described herein. Alternatively, the heliostats can be aimed and controlled by computers.

As implied from the foregoing, the heliostat and the remainder of the solar systems were frequently located in terrain experiencing wide diurnal and seasonal temperature variations. These temperature variations induced differential thermal expansion between the mirror and supporting substrate and resulted in thermal stresses and curvature effects which degrade the reflected solar image. In addition, day-night temperature and humidity fluctuations often resulted in the condensation of water vapor between the mirror and substrate which in turn lead to mirror damage.

The heliostat built in accordance with this invention alleviates these problems.

Referring to FIGS. 1–4, there is illustrated a heliostat 11 in accordance with an embodiment of this invention. The heliostat 11 includes a main support structure 13, FIGS. 1 and 2, and means 15 for pivoting and tilting a plurality of mirror modules 17.

The main support structure 13 includes a vertical support such as post 19 embedded in a foundation 21, such as concrete. The post 19 is ordinarily of steel pipe or the like. As will be apparent, any support structure adequate to withstand the loads imposed will be satisfactory.

The means 15 comprises the usual combination of motors, gears and pinions for rotating the heliostat with respect to the vertical axis of the post 19 and for rotating horizontal extending arms 23 and, hence, tilting the base of the heliostat, including mirror modules 17. As illustrated, the heliostat may be fastened in the vertical or horizontal position for being stored over the night, during windstorms and the like. Suitable fastening means such as latches or the like can be employed to augment and take the strain off the means 15 for pivoting and tilting the heliostat. The means 15 pivots and tilts the heliostat to keep the solar energy focused on the collector. This focusing may be done from respective sensors as indicated. On the other hand, if desired, means may be tied into a calculator, with or without having a response fed from a sensor, to maintain the reflected beam focused onto the collector. The system employed is relatively immaterial to this invention.

As indicated hereinbefore, this invention is concerned with a mirror module being firmly stabilized against curvature induced by temperature changes. The respective mirror modules 17, FIGS. 3–6, include an internal support structure 25, front sheet 27 serving as mirror backing sheet and back sheet 29 and a layer of silicone grease 31 slidably holding the mirror 33 to the front sheet 27.

The internal support structure has sufficient rigidity to support the mirror 33 cantilevered from the main support structure 13 and to withstand predetermined loads. By predetermined loads is meant structural loads induced by the weight of the materials, by wind, by snow, by ice and the like. As illustrated, the internal structure includes a plurality of beams extending either directionally coincident or transversely of the mirror. Expressed otherwise, the beams 35 extend vertically in the heliostat 11 of FIG. 1 where the longitudinal dimension of the mirror is disposed horizontally. Alternatively, the beams may extend longitudinally of the mirror. The beams may comprise C-beams, Z-beams, I-beams, continuous plastic foam slabs or the like. It has been found advantageous to employ the Z-beams, FIGS. 3 and 4, or C-beams, FIGS. 5, 6, 11, and 12; since the beams can be formed readily and readily fastened, as by soldering, bradding, adhering or the like, to the respective front and back sheets 27, 29.

The front and back sheets 27 and 29 have the same coefficient of thermal expansion such that no curvature is induced into the mirror module by temperature changes even if the internal beams are of a dissimilar material. The front and back sheets 27 and 29 have adequate structural strength to stabilize the internal support structure 25. Expressed otherwise, the front and back sheets 27 and 29 are rigidly affixed to the beams 35. As illustrated, the front and back sheets may be soldered, bradded, adhered, or otherwise affixed to the internal support structure. If bradded, the heads are preferably indented such that a flat front sheet is provided for affixing the mirror as described later hereinafter. Preferably, the front and back sheets are adhered to the beams with an adhesive material. Typical of the adhesives that are employed are the polyacrylic adhesives such as Versilok 201 available from Hughson Chemical Division of the Lord Corporation, Erie, Pa. As is recognized, these polyacrylics set up and adhere when they are subjected to an accelerator which is also commerically available. Typical of these accelerators are the amines such as N,N-dimethyl-para-toluidine and N,N-dimethylaniline. On the other hand, there are other adhesives such as epoxy resins that may be employed with accelerators such as cobalt napthenate, alone or in conjunction with methyl ethyl ketone peroxide catalyst. Sources are DuPont, Wilmington, Del.; Dow Chemical Company, Midland, Mich.; Shell Chemical Company, Houston, Tex.; Rome and Hauss Chemical Company, St. Louis, Mo.; Hughson Chemical, Erie, Pa.

The respective materials of constructions for the front and back sheets 27 and 29 are the same. The internal support structure material may be of the same or a different material. As illustrated, they are formed of sheet metal such as galvanized steel. Other materials may be employed. For example, aluminum sheet members may be employed which have the same coefficient of thermal expansion. Other exotic materials of construction; such as brass, titanium, and even plastic; may be employed if desired, although ordinarily not necessary in this art.

Figure 3:
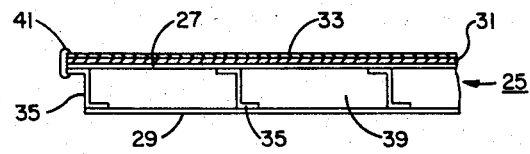
FIG. 3 is a partial cross sectional view of the mirror modules of FIG. 1, looking from the top.
Figure 6:
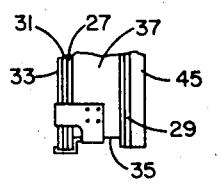
Figure 4:
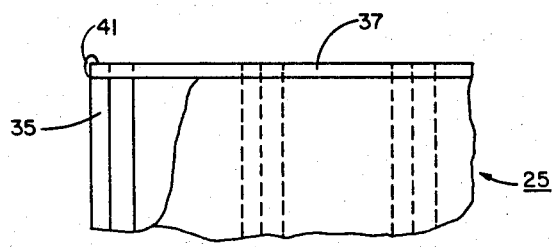
FIG. 4 is a front elevational view of a mirror module similar to FIG. 3 but having a top beam covering the top of the internal support structure

In the illustrated embodiment of FIGS. 3 and 4, a top member 37 and a bottom member 39 are employed. As illustrated, top and bottom members 37, 39 are formed of sheet metal and also form a box enclosure in combination with the respective front and back sheets and the beams. The top and bottom members 37 and 39 are advantageous in preventing building a bird's nests or the like interiorly or the structure. In addition, the top and bottom members provide strength against flexure.

Vents are preferably employed to alleviate problems with moisture condensation and accumulation.

The result of the structural module is that the predetermined shape, such as flat, is maintained; regardless of temperature change, since the glass mirror and substrate may freely differentially thermally expand or contract without inducing thermal stress or curvature effects such as would be experienced with a rigidly bonded assembly of dissimilar materials.

The mirror 33 is assembled to the front sheet 27 by silicone grease 31. The silicone grease 31 is preferably hydrophobic so as to repel water. Any of the various silicone greases may be employed that have water repellency and have adequate strength to support the mirror, yet have sufficient shear tolerance to permit differential expansion of the mirror and the substrate when the temperature changes without inducing stresses or curvature effects. The silicone grease also is adapted to hold the mirror securely and prevent fluttering of the mirror with respect to the front sheet. In addition, the silicone grease also serves to protect the back side of the mirror against the adverse affects of weathering and condensation of water vapor and prevents the weather from splotching and damaging the mirroring material on the back of the mirror Typical of the silicone greases that are employed are those satisfying military specifications MIL S-8660B; for example, dimethyl silicone. A satisfactory commercially available product is Dow Corning's "4 Compound" (a trademark).

Figure 11:
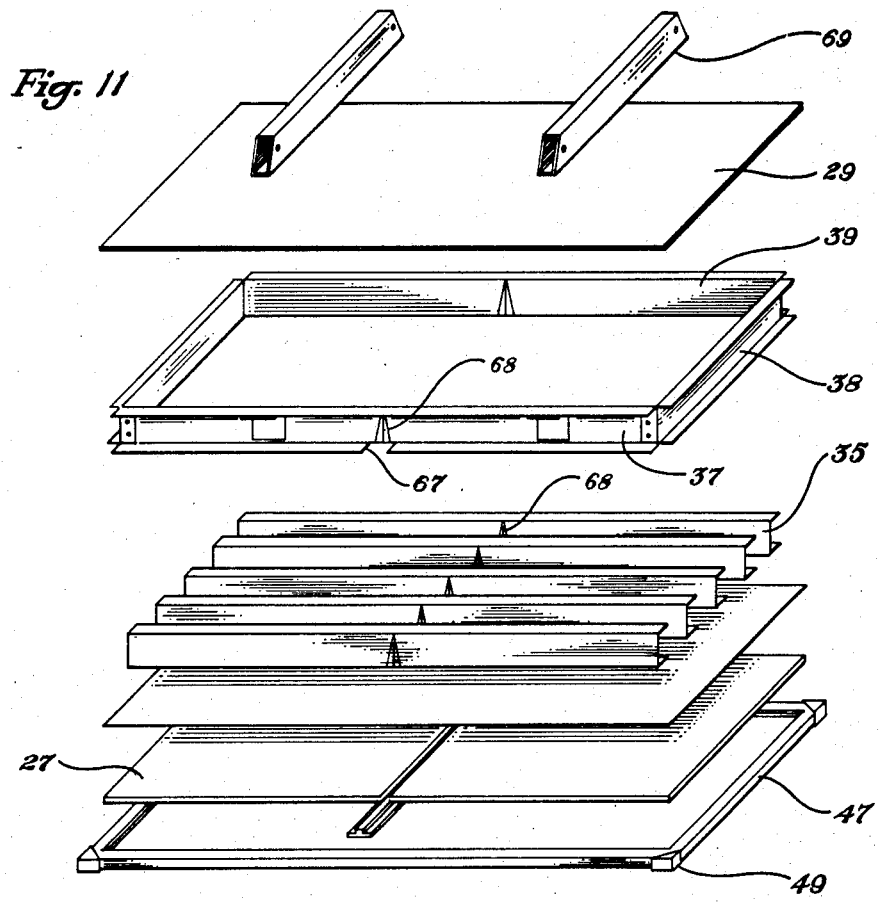
FIG. 11 is an exploded view of the mirror module showing a center aberration allowing the substrate assembly to be bent to the configuration of the mirror facets.

In the illustrated embodiment, the silicone grease is supplemented by edge molding and corner covers 47, 49, FIG. 11. Clips, such as metallic clips can also be employed to add to the physical retaining features of the mirror, engaging the edges of the front plate, or mirror backing plate, 27. If desired, a rubber grommet 41, FIG. 3, can be employed around the edges of the mirror to alleviate problems with water tending to seep between the mirror and the mirror backing sheet.

Figure 7:
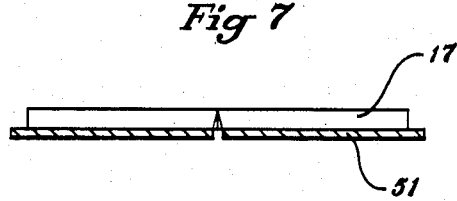
FIG. 7 is a schematic side elevational view showing the mirror module emplaced upon a pair of granite blocks forming the bed
Figure 8:
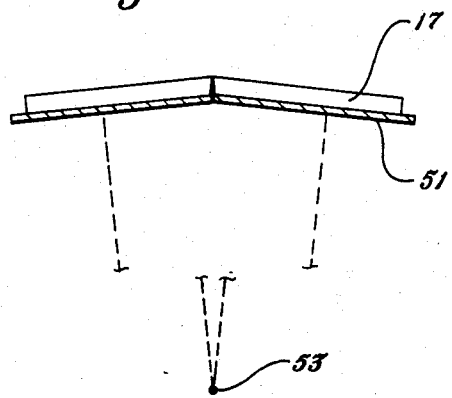
FIG. 8 is a schematic side elevational view showing a plurality of mirror facets in the mirror module emplaced upon a pair of granite blocks forming the bed and angled so as to effect a mirror module that focuses onto a target at a predetermined distance when operationally installed.
Figure 9:
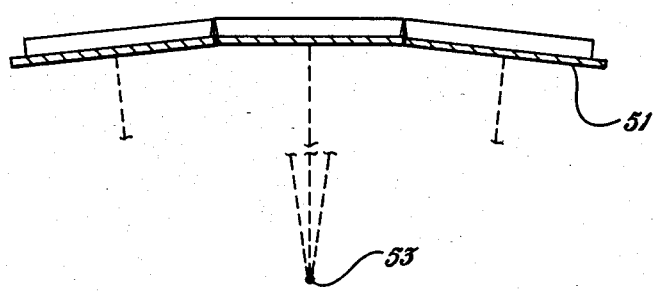
FIG. 9 is a schematic side elevational view showing a mirror module with three granite beds and three mirror facets so as to focus on a target collector at a predetermined distance when operationally installed.

In operation, there is first formed a solid, rigid bed of predetermined configuration and dimensions and having at least one planar section adapted to receive a mirror face down thereon. As can be seen in FIGS. 7, 8 and 9, typical solid rigid beds are marble blocks or other large beds 51 that resist movement and yet will accommodate the front part of the mirror when it is laid face down thereon. As illustrated, the bed 51 comprises two sections to accommodate the full length of the module 17 thereon. For example, as illustrated in FIG. 7, the bed 51 comprises two granite slabs with ends contiguous each other so that the entire module 17 can be laid thereon. The module 17 may have one mirror facet since the top surface of the beds are aligned or it may have two or more mirror facets. In FIGS. 8 and 9, the granite blocks forming the bed 51 are inclined at respective focusing angles such that the mirror facets in a completed mirror module effect the focusing of the solar energy onto a collector. In FIG. 8, for example, there are two mirror facets, one on each side such that the module effects focusing on the target 53 at some predetermined distance away. The target is ordinarily a collector as set forth hereinbefore. In FIG. 9, there are three beds 51 that are set at focusing angles such that three mirror facets can be emplaced thereon to focus onto the target 53. As will be apparent, the angles shown in FIGS. 8 and 9 are exaggerated. In fact, a focusing may be such that the rays are focused at 200 to 800 feet such that less than one inch; for example, only about one half inch; per 12 foot of length of bed is necessary to effect the desired focusing.

While granite blocks have been described as the bed, any other massive structure that has a smooth planar surface can be employed. For example, other rocks than granite can be employed. Massive wooden structures can be employed. What is imperative is that the top surface be planar, smooth, and avoid scratching the mirror surface.

The mirror is laid face down on the top nonscarring surface of the bed 51. Jigs may be employed to faciliate alignment. A thin, uniform layer of silicone grease is applied to the back of the mirror. For example, a uniform layer 0.001 inch-0.005 inch thick is applied. As implied hereinbefore, as many mirror facets are laid down on the bed as is necessary to effect the desired frontage of mirror surface for the mirror module 17.

Respective mirror backing sheets of the desired dimensions to cover the back side surface of the mirror facets are then formed. The mirror backing sheet must have adequate strength to support the mirror and resist cold flowing. Consequently, ordinarily a metallic mirror backing sheet is used. The metal may be of aluminum or galvanized steel or the like. A thin layer of silicone grease is applied to the front of the mirror backing sheet, also referred to as front plate in the hereinbefore referenced patent application Ser. No. 6,138,207, now U.S. Pat. No. 4,373,783 issued Feb. 15, 1983. The layer of silicone grease is the same, or at least compatible with that applied to the back side surface of the mirror. The thickness of the layer is in the same range of thicknesses as that applied to the back side of the mirror; namely, 0.001 inch-0.005 inch thick. As implied hereinbefore the silicone grease may be diluted and brushed onto the respective surfaces. Preferably it is rolled on in the viscous form.

Figure 10:
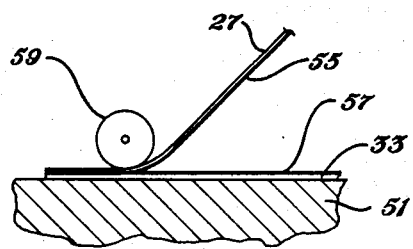
FIG. 10 is a schematic side elevational view, partly in section, showing the applying of the mirror backing sheet to the back side of the mirror.

Next the front side of the mirror backing sheet 27 with its layer of silicone 55 is carefully applied in edge to edge relationship with the mirror 33 and contiguous the layer of silicone 57 on the back side surface of the mirror 33. The mirror backing sheet is carefully rolled, as by roller 59, FIG. 10, to eliminate any air bubbles. The roller will be rolled longitudinally initially but as soon as there is sufficient space laid down, it will also be rolled transversely to effect removal of air bubbles such that the silicone grease adheres uniformally across the total area.

Figure 10A:
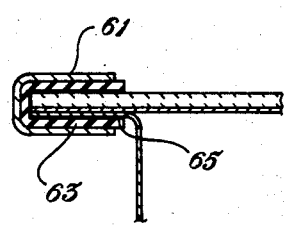
FIG. 10a is a partial cross sectional view of a front edge of the module of FIG. 11.

Respective substrate assemblies are formed by affixing a back sheet to respective internal support structure. The internal support structure, as indicated hereinbefore will have sufficient rigidity to support the mirror cantilevered from the main support structure of the heliostat and to withstand predetermined loads. The back sheet has the same coefficient of thermal expansion and contraction as the mirror backing sheet such that no curvature is induced by temperature changes. Thus, where the mirror backing sheet is a metallic sheet, a metallic sheet of the same gage material will be employed as the backing sheet on the substrate assembly. The mirror backing sheet and the back sheet have adequate structural strength to stabilize the internal support structure of the substrate assembly. In the illustrated embodiments the substrate assembly comprises a plurality of beams 35. The beams may be Z-beams as illustrated in FIG. 3 or C-beams or webs as illustrated in FIG. 11. A top beam 37 and bottom beam 39 can be employed in conjunction with end beams 38 to form a box around the structure. The respective beams may be affixed to the backing sheet, or back sheet 29 by any means such as brads, bonding, screws, bolts or the like. Preferably, the structural elements are bonded together similarly as they would be bonded to the mirror backing sheet. The respective C-beams may be held in place on the backing sheet by suitably placed magnetic means until the bond is set. Thereafter, the substrate assembly has the bonding material applied to the front edges of the beams and is affixed to the mirror backing sheet to leave the sheet edges protruding for affixing of a metal edge molding 61, or the like shown in FIG. 10a. As illustrated, a rubber molding 63 together with a suitable adhesive 65 may be employed around the edges.

Figure 12:
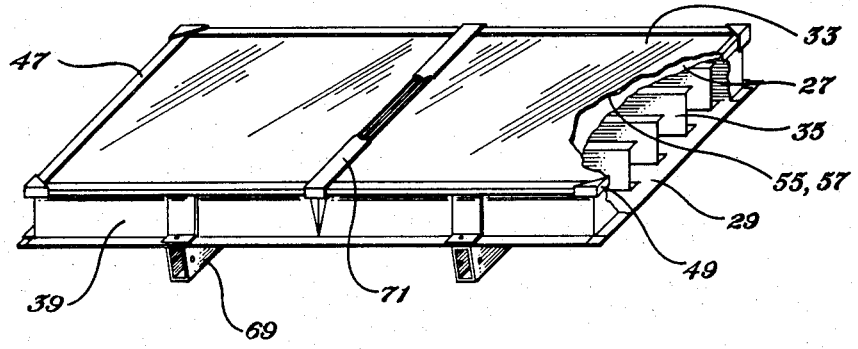
FIG. 12 is an isometric view, partly cut away, showing the mirror module of FIG. 11.

As illustrated, in FIG. 11, a portion of the flange 67 may be cut away from the respective longitudinally extending beams to allow bending at the point 68 to accomodate the canting of the mirror surfaces as illustrated in FIG. 8 or the like. The finished product is illustrated in FIG. 12 wherein the bottom beam 39 is affixed to the mounting brackets 69. Respective edge molding, corner 47, 49 is applied as is the center molding 71 leaving the mirror surface 33 capable of reflecting the solar energy.

The respective mirror modules are affixed, as by bolts, welding or the like to the main structural members of the main support structure of the heliostat. Usually, the supporting structure is attached, as implied hereinbefore, to the horizontal arms 23 of the heliostat so as to be pivoted with respect to the vertical axis for reflecting the sun onto the collector. Suitable circular pinion gears are employed in conjuction with gear and electric motor to rotate with respect to the vertical axis of the post 19.

As illustrated, the mirror modules are formed in sections of about 4 foot wide by 12 foot long. There are six such modules on each side of the illustrated heliostat so there are a total of 12 such modules. If desired, of course, the mirror modules may be made in other dimensions such as 4 foot by 4 foot, 4 foot by 6 foot, or the like. The modules supporting the mirror may be from 3 to 5 inches or more in thickness depending upon the dimensions of the structural beams 35 employed.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

I claim:

1. A method of forming mirror modules for a heliostat, having a main support structure, for reflecting solar energy onto a collector comprising the steps of
   a. forming a solid, rigid bed of predetermined configuration and dimensions and having at least one planar section adapted to receive a planar mirror facet;
   b. emplacing at least one mirror facet on said bed section downwardly to expose the backside surface of said mirror facet;
   c. applying to said backside surface a thin layer of a silicone grease, said layer having a thickness in the range of 0.001 inch-0.005 inch;
   d. forming a mirror backing sheet of desired dimensions to cover the backside surface of said at least one mirror facet and support said mirror facet;
   e. applying to a front side of said mirror backing sheet a thin layer of said silicone grease, said layer having a thickness in the range of 0.001 inch-0.005 inch;
   f. applying the greased front surface of said mirror backing sheet to the greased backside surface of said mirror by flexing said backing sheet and progressively and simultaneously applying and rolling from one end edge thereof to substantially eliminate air bubbles until the entire backing sheet is firmly applied to said at least one mirror facet;

g. forming a substrate assembly by affixing a back sheet to respective internal support structure; said internal support structure having sufficient rigidity to support said mirror cantilevered from the main support structure of the heliostat and to withstand predetermined loads; said back sheet having the same co-efficient of thermal expansion and contraction as said mirror backing sheet such that no curvature is induced by temperature changes; said back sheet having adequate structural strength in combination with said mirror backing sheet to stabilize said internal support structure;

h. adhesively bonding said substrate assembly to said mirror backing sheet whereby there is formed a mirror module that prevents fluttering of said mirror with respect to said mirror backing sheet and to protect the mirror backside against the adverse effects of weather and eliminate curvature induced by temperature changes.

2. The method of claim 1 wherein said substrate assembly is formed by a plurality of beams extending across said mirror module and affixed to said back sheet and bonded to said mirror backing sheet.

3. The method of claim 1 wherein said substrate assembly has a lip and a metal edge seal is bonded to the mirror and substrate assembly lip.

4. The method of claim 1 wherein said bed has a plurality of said planar sections and respective mirror facets are emplaced face downwardly on said planar sections and adjacent each other to form a substantially continuous mirror front 5. The method of claim 4 wherein said planar sections are inclined at respective focusing angles such that said mirror facets effect focusing of the said solar energy on the collector at a predetermined distance away from the heliostat when operationally emplaced.

6. The method of claim 5 wherein there are two planar sections and two mirror facets having a junction therebetween.

7. The method of claim 6 where a center molding and cover are applied to said junction.

8. The method of claim 5 wherein there are at least three planar sections and at least three mirror facets having at least two junctures therebetween.

9. The method of claim 8 wherein there are at least two center moldings and covers that are applied to said junctures.

10. The method of claim 8 wherein said mirror backing sheet and said back sheet of said substrate assembly are metallic.

* * * * *